(12) United States Patent
Bishop et al.

(10) Patent No.: US 8,177,089 B1
(45) Date of Patent: May 15, 2012

(54) REUSABLE TAMPER INDICATING TRANSPORT TUBE

(75) Inventors: Steven S. Bishop, Severna Park, MD (US); Stephen R. Campbell, Crownsville, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 321 days.

(21) Appl. No.: 12/587,325

(22) Filed: Sep. 30, 2009

(51) Int. Cl.
*B65D 55/04* (2006.01)
*B65D 45/16* (2006.01)
*B65D 51/18* (2006.01)
*B65D 21/06* (2006.01)

(52) U.S. Cl. ............ 220/214; 220/324; 220/254.8; 220/23.89

(58) Field of Classification Search ........... 220/254.8, 220/254.1, 348, 345.2, 345.1, 23.88, 200, 220/FOR. 184, FOR. 183; 215/206, 316, 283, 280, 10, 200, 201; *B65D 55/04, 55/02, 45/16, 21/06, 21/04, 21/02*
See application file for complete search history.

(56) References Cited

U.S. PATENT DOCUMENTS

| | | | | |
|---|---|---|---|---|
| 2,172,864 A * | 9/1939 | Calva et al. | ............ | 206/527 |
| 4,236,463 A | 12/1980 | Westcott | | |
| 4,782,977 A | 11/1988 | Watanabe et al. | | |
| 5,722,547 A * | 3/1998 | Shankland | ............ | 215/230 |

* cited by examiner

*Primary Examiner* — Mickey Yu
*Assistant Examiner* — Robert J Hicks
(74) *Attorney, Agent, or Firm* — Roshni Kurian

(57) ABSTRACT

A reusable tamper indicating transport tube that can be used to securely transport large drawings and other documentation without damaging or distorting them. The tamper-evident tube comprises an outer tube, an inner tube, an outer cap, an inner tube cap, an inner tube locking mechanism, and an outer tube locking mechanism that is affixed to the peripheral surface of the outer cap.

20 Claims, 2 Drawing Sheets

REUSABLE TAMPER INDICATING TRANSPORT TUBE

FIELD OF INVENTION

The present invention pertains to special receptacles, and in particular to tamper indicating receptacles.

BACKGROUND OF THE INVENTION

In today's fast paced world of business, documents are often transported from one location to another and it is necessary to protect against loss, theft, and tampering. Therefore, there is a great need for a carrier that can securely transport large documents without damaging or distorting the documents while simultaneously deterring an unauthorized individual from viewing, stealing, or tampering with the contents of the tube.

The prior art includes well known commercial items including Pelican™ cases, Rifkin Bags, Carriers for Lefebure Tal-Air, and the Tranzporter Tube. Unlike the present invention, the prior art lacks features that would make any evidence of tampering easily visible and fails to incorporate security measures that would provide for added protection of documents. For instance, carriers like the Tranzporter tube fail to provide a high level of security because the interior insert is not lockable and the external casing is only secured by a zipper lock. Additionally, carriers like those used in the banking industry lack a locking mechanism inherently needed to secure the storage well.

U.S. Pat. No. 4,236,463, entitled "Tamper Proof Case for the Protection of Sensitive Papers," discloses a hinged carrying case that includes an interior liner for holding sensitive papers. However the present invention does not employ an electrical circuit or any form of an igniter, as does U.S. Pat. No. 4,236,463 that would cause the papers to be charred if the case is tampered with. Additionally, the prior art doesn't allow for the secure transport of large drawings or documents. U.S. Pat. No. 4,236,463 is hereby incorporated by reference into the specification of the present invention.

U.S. Pat. No. 4,782,977, entitled "Tamper Resistant Container," discloses a container that uses hasps to protect the contents of the container from tampering. While the present invention utilizes hasps, it also uses other means of securing the contents of the case in a way that is distinguishable from the device taught in U.S. Pat. No. 4,782,977. Additionally, the prior art doesn't allow for the secure transport of large drawings or documents without folding the documents. U.S. Pat. No. 4,782,977 is hereby incorporated by reference into the specification of the present invention.

Therefore, there is a need for a secure means of transporting large documents without damaging or destroying them. Such a need is met by the present invention.

SUMMARY OF THE INVENTION

The present invention is a reusable tamper indicating transport tube that can be used to transport large drawings and other documentation without damaging or destroying them.

Another object of the present invention is to make available a tamper indicating transport tube that would appeal to a broad spectrum of customers including the individual buyer, the business user, and the government user.

The tamper-evident transport tube which is the subject of this patent invention comprises an outer tube, an inner tube, an outer cap, an inner tube cap, an inner tube locking mechanism, and an outer tube locking mechanism that is affixed to the peripheral surface of the outer cap.

DETAILED DESCRIPTION

The present invention is a reusable tamper indicating transport tube that can be used to transport large drawings or documentation that may contain confidential information without wrinkling, damaging or destroying the documentation. This tube can be fabricated in a variety of sizes.

Figure 1:
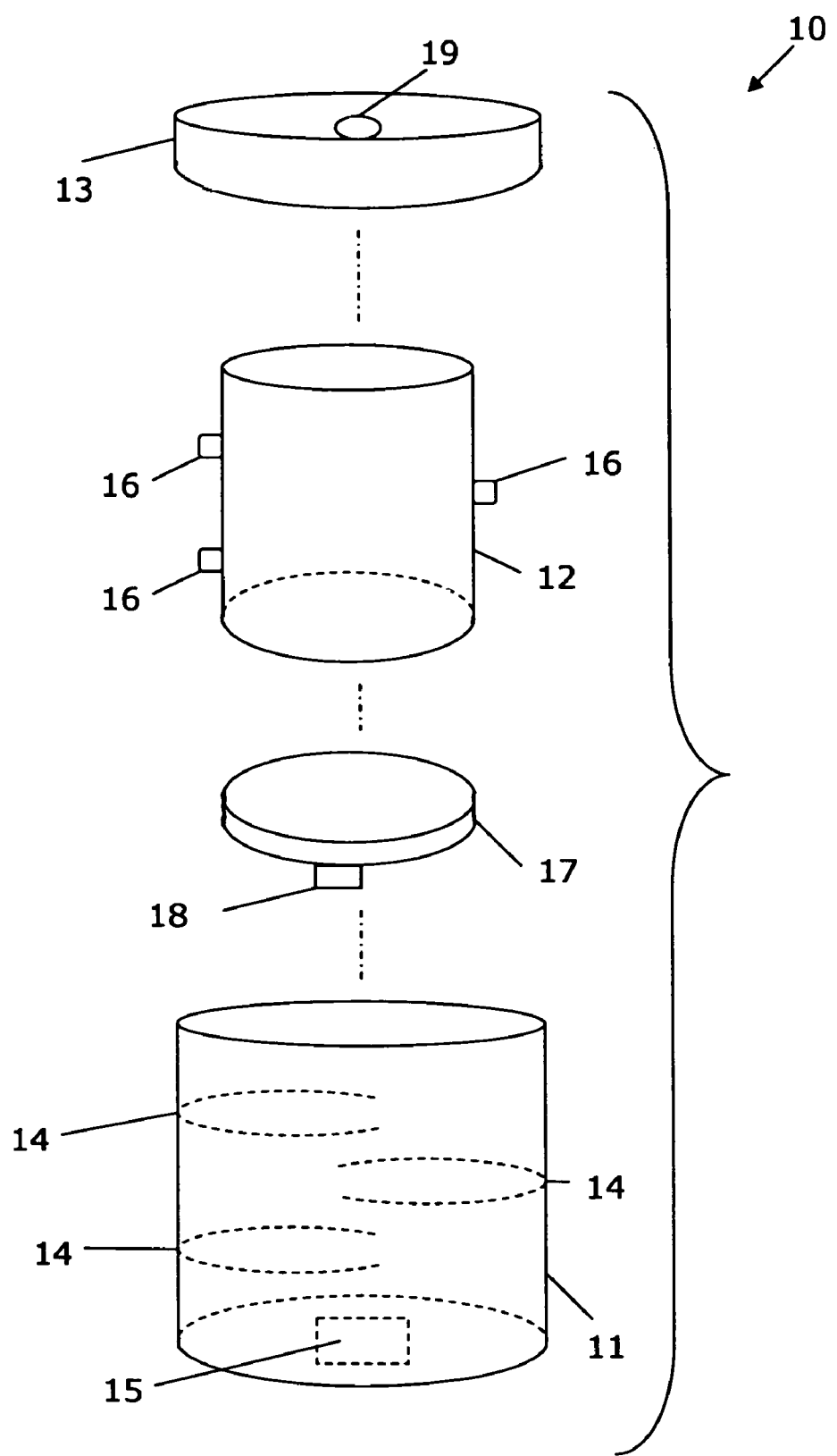
FIG. 1 is a an exploded view of the tamper resistant transport tube.

FIG. 1 is an exploded view of the secure nested tamper indicating transport tube 10. FIG. 1 depicts a tamper resistant tube 10 with an outer tube 11, an inner tube 12, and an outer cap 13.

The outer tube 11 is a cylindrical device without any exposed seams on its surface and is seamless throughout the body, with the exception of an opening that receives the inner tube 12. The use of a seamless body also prevents infiltration via the seams surrounding the outer cap 13. Furthermore, a seamless body better displays any potential tampering to the outer tube 11. The outer tube 11 has at least one ridge 14 that extend longitudinally across the internal surface of the outer tube 11. Ideally, the outer tube 11 should have more than one ridge 14. These ridges 14 are offset such that the inner tube 12 can rotate within a limited range of motion such that the locking mechanism 18 of the inner tube cap is accessible via the window 15 once the inner tube 12 is nested within the outer tube 11.

The inner tube 12 is a cylindrical tube with at least one hasp 16 that is located on the outer surface of the inner tube 12. The inner tube 12 ideally should have a plurality of hasps 16 that are spring-loaded and equal to the number of ridges 14 in the outer tube 11. The inner tube 12 has an inner tube cap 17 that closes the inner tube 12. Once the inner tube 12 is placed within the outer tube 11, locking the inner tube's locking mechanism 18 on the inner tube cap 17 activates hasps 16, causing the hasps 16 to pop out of the outward surface of the inner tube 12 and sit within the horizontal ridges 14 located on the internal surface of the outer tube 11.

In using the transport tube 10, the inner tube 12 receives the documents and is secured by the inner tube cap 17 on the inner tube 12 by activating a first locking mechanism 18. Once the inner tube 12 is secure, the inner tube 12 is inserted into the outer tube 11 such that the locking mechanism 18 on the inner tube 12 is visible through the window 15 on the outer tube 11. The transport tube 10 can then be fully secured by rotating the outer cap 13 and activating the locking mechanism 19 on the outer cap 13 into a locked position. The rotating action of the outer cap 13 causes the inner tube 12 to rotate, moving the hasps within the ridges. Additionally, the rotation of the outer cap 13 simultaneously rotates the inner tube 12 such that the locking mechanism 18 on the inner tube 12 is no longer accessible through the window 15 on the outer tube 11.

Figure 2:
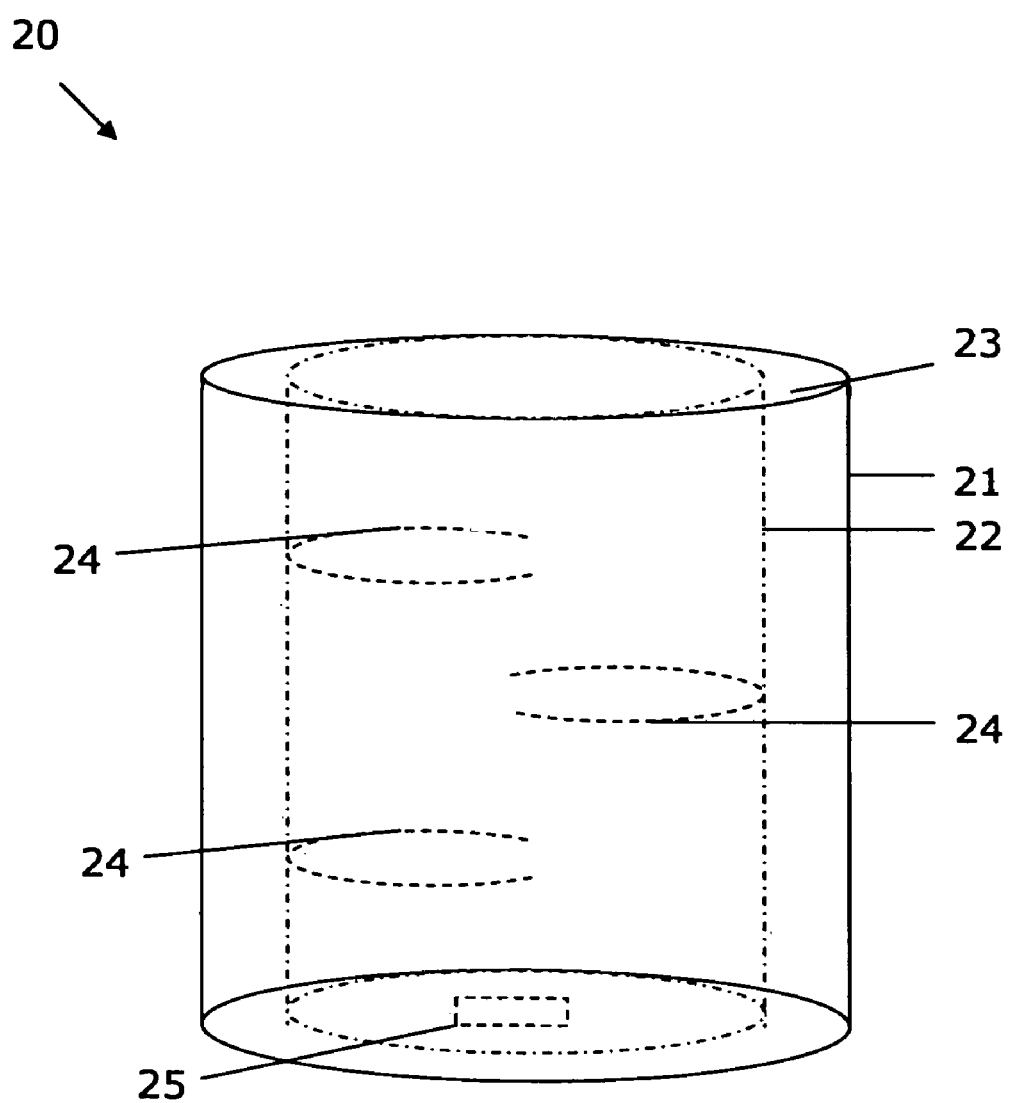
FIG. 2 is a view of the outer tube of an alternate embodiment.

In an alternate embodiment, as depicted in FIG. 2, the outer tube 20 is a cylindrical tube that is double walled, i.e., it has an outer shell 21, an internal surface (not shown), and a nested tube 22. The nested tube 22 which receives the inner tube (not shown) has at least one ridge 24. Here, the nested tube 22 forms an interior area 23 between the outside surface of the nested tube 22 and the internal surface of the outer shell 21.

The interior area 23 is lined with a material that contains a tamper-indicating substance or fluid (not shown) such that if the lining surrounding the interior area 23 is punctured, the substance or fluid leaks out into the interior area 23 to indicate that tampering has occurred. While the tamper-indicating substance or fluid can be of a varying nature, it is ideally a viscous fluid that is a different color than the color of the transport tube. Like the outer tube 11 in the first embodiment of the transport tube 10 in FIG. 1, the other tube 20 in this embodiment, as shown in FIG. 2, can also have multiple ridges 24 on the inside surface of the nested tube 22. These ridges 24 are offset such that the inner tube 12 from FIG. 1 can rotate within a limited range of motion such that the locking mechanism 18 of the inner tube cap 17 is accessible via the window 25 once the inner tube 12 is nested within the outer tube 11,20.

With regard to the manufacturing of the present invention, the preferred embodiment includes integrated locking mechanisms on both the outer tube 11, 20 and the inner tube 12 that are composed of an immovable lock. However, it is conceivable that a variety of locks can be incorporated into this design. Additionally, the transport tube 10 can be made using a variety of materials but the preferred embodiment should be fabricated from opaque hard plastics so that the tube 10 cannot be accessed by cracking the case and tampering attempts will be visible easily. As stated before, all surfaces of the outer tube 11, 20, the nested tube 22, and the inner tube 12 should be seamless, i.e., there shouldn't be any exposed seams on the surface of the body in order to make it easier to inspect for point of content exfiltration attempts. In addition to hard plastics, the transport tube can also be made of stainless steel or lighter materials that indicate exposure to cutting, breakage, etc. Additionally, any embodiment of the transport tube 10 should be manufactured to withstand a drop such that "normal" usage will not result in a tamper event.

It is also understood that any embodiment of this invention Can include the use of plastic molded with fleck or some unique identifier to deter substitution of any part of the tube 10 that has been tampered with. Also, the outer tube 11, 20, inner tube 12, outer cap 13, and inner tube cap 17, can include serial numbers or other means to uniquely identify the tubes and caps to thwart substitution attack. The use of tamper-indicating features like tamper-indicating labels, serial numbers, and/or other unique identifiers (not shown) on the outer tube 11, 20, inner tube 12, outer cap 13 and inner tube cap 17 ensures the ability to recognize any attempt, by an unauthorized individual, to replace any of the components of the tube 10 and would automatically notify the rightful owner or receiver that the entire unit has been compromised. Alternative embodiments can also be designed such that specific areas are made thinner to make prying visible.

While the preferred embodiment has been disclosed and illustrated in detail, it should be understood that a variety of modifications and substitutions can be made to the present invention without departing from the spirit and scope of the invention as defined by the claims.

What is claimed is:

1. A tamper indicating transport tube, comprising:
   a) an outer tube having an open end, a closed end, a circumference and an internal surface that has at least one ridge;
   b) a window, where said window is located on said closed end of said outer tube;
   c) an inner tube having a top end and an outer surface;
   d) at least one hasp, where said hasp is connected to said outer surface of said inner tube;
   e) an inner tube cap having an exterior surface;
   f) an inner tube locking mechanism that is affixed to said exterior surface of said inner tube cap;
   g) an outer cap having a peripheral surface, where the connection of said outer cap to said open end of said outer tube simultaneously rotates said inner tube so as to make said inner tube locking mechanism inaccessible via said window; and
   h) an outer tube locking mechanism that is affixed to said peripheral surface of said outer cap.

2. The device of claim 1, wherein said ridge of said outer tube, having a user-definable depth, are spaced equidistantly on said internal surface of said outer tube, and spans, longitudinally, at least a quarter of the length of the circumference of the outer tube.

3. The device of claim 2, wherein said hasp is spaced on said outer surface of said inner tube such that said hasp is in alignment with said ridge when said inner tube rests within said outer tube such that said top end of said inner tube is visible through said window of said outer tube.

4. The device of claim 3, wherein said inner tube and said outer tube are seamless.

5. The device of claim 4 further comprises a tamper-indicating feature selected from the group of a tamper-indicating label, a serial number, and a unique identifier.

6. The device of claim 5 wherein said hasp is a spring-load hasp that is activated when said inner tube locking mechanism is locked.

7. The device of claim 1, wherein said hasp is spaced on said outer surface of said inner tube such that said hasp is in alignment with said ridge when said inner tube rests within said outer tube such that said top end of said inner tube is visible through said window of said outer tube.

8. The device of claim 1, wherein said inner tube and said outer tube are seamless.

9. The device of claim 1, further comprises a tamper-indicating feature selected from the group of a tamper-indicating label, a serial number, and a unique identifier.

10. The device of claim 1 wherein said hasp is a spring-load hasp that is activated when said inner tube locking mechanism is locked.

11. A tamper indicating transport tube, comprising:
   a) an inner tube, having a top end and an outer surface;
   b) an outer tube, having an open end, a closed end, and an internal surface,
   c) a nested tube, having a circumference, where said nested tube is within said outer tube and can receive said inner tube, where said nested tube further comprises an inside surface that has at least one ridge, and an outside surface such that an interior area that contains a tamper-indicating fluid is formed between said outside surface of said nested tube and said internal surface of said outer tube;
   d) a window, where said window is located on said closed end of said outer tube;
   e) at least one hasp, where said hasp is connected to said outer surface of said inner tube;
   f) an inner tube cap having an exterior surface;
   g) an inner tube locking mechanism that is affixed to said exterior surface of said inner tube cap;
   h) an outer cap having a peripheral surface, where the connection of said outer cap to said open end of said outer tube simultaneously rotates said inner tube so as to make said inner tube locking mechanism inaccessible via said window; and
   i) an outer tube locking mechanism that is affixed to said peripheral surface of said outer cap.

12. The device of claim 11, wherein said ridge of said nested tube, having a user-definable depth, are spaced equidistantly on said internal surface of said nested tube, and spans, longitudinally, at least a quarter of the length of the circumference of the nested tube.

13. The device of claim 12, wherein said hasp is spaced on said outer surface of said inner tube such that said hasp is in alignment with said ridge when said inner tube rests within said nested tube such that said top end of said inner tube is visible through said window of said outer tube.

14. The device of claim 13, wherein said inner tube and said outer tube are seamless.

15. The device of claim 14 further comprises a tamper-indicating feature selected from the group of a tamper-indicating label, a serial number, and a unique identifier.

16. The device of claim 15 wherein said hasp is a spring-load hasp that is activated when said inner tube locking mechanism is locked.

17. The device of claim 11, wherein said hasp is spaced on said outer surface of said inner tube such that said hasp is in alignment with said ridge when said inner tube rests within said outer tube such that said top end of said inner tube is visible through said window of said outer tube.

18. The device of claim 11, wherein said inner tube and said outer tube are seamless.

19. The device of claim 11 further comprises a tamper-indicating feature selected from the group of a tamper-indicating label, a serial number, and a unique identifier.

20. The device of claim 11 wherein said hasp is a spring-load hasp that is activated when said inner tube locking mechanism is locked.

* * * * *